United States Patent
Haikney et al.

(10) Patent No.: US 9,489,232 B2
(45) Date of Patent: *Nov. 8, 2016

(54) TECHNIQUES FOR ATTESTING DATA PROCESSING SYSTEMS

(75) Inventors: David Haikney, Manchester (GB); David Nigel Mackintosh, Manchester (GB); Jose Juan Palacios Perez, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 743 days.

This patent is subject to a terminal disclaimer.

(21) Appl. No.: 13/988,051

(22) PCT Filed: Sep. 20, 2011

(86) PCT No.: PCT/EP2011/066329
§ 371 (c)(1),
(2), (4) Date: Jul. 29, 2013

(87) PCT Pub. No.: WO2012/065774
PCT Pub. Date: May 24, 2012

(65) Prior Publication Data
US 2013/0305364 A1    Nov. 14, 2013

(30) Foreign Application Priority Data

Nov. 18, 2010 (EP) .................................. 10191669
Nov. 18, 2010 (EP) .................................. 10191673

(51) Int. Cl.
*G06F 21/00*    (2013.01)
*G06F 9/46*    (2006.01)
*G06F 21/57*    (2013.01)

(52) U.S. Cl.
CPC .................. *G06F 9/46* (2013.01); *G06F 21/57* (2013.01)

(58) Field of Classification Search
CPC .................................. G06F 21/57; G06F 9/46
See application file for complete search history.

(56) References Cited

U.S. PATENT DOCUMENTS

| | | | |
|---|---|---|---|
| 5,511,191 A | 4/1996 | de Leeuw van Weenen et al. |
| 6,539,480 B1 | 3/2003 | Drews |

(Continued)

FOREIGN PATENT DOCUMENTS

| | | |
|---|---|---|
| CN | 10703014 A | 11/2005 |
| CN | 1954288 A | 4/2007 |

(Continued)

OTHER PUBLICATIONS

"TCG Specification Architecture Overview", Specification Revision 1.4 Aug. 2, 2007, pp. 1-54.*

(Continued)

*Primary Examiner* — Mohammad A Siddiqi
(74) *Attorney, Agent, or Firm* — Michael R. Long; Steven L. Bennett (57) ABSTRACT

A technique for attesting a plurality of data processing systems includes generating a logical grouping for a data processing system. The logical grouping is associated with a rule that describes a condition that must be met in order for the data processing system to be considered trusted. A list of one or more children associated with the logical grouping is retrieved. The one or more children are attested to determine whether each of the one or more children is trusted. In response to the attesting, the rule is applied to determine whether the condition has been met in order for the data processing system to be considered trusted. A plurality of logical groupings is associated to determine whether an associated plurality of data processing systems can be considered trusted.

7 Claims, 9 Drawing Sheets

(56) References Cited

U.S. PATENT DOCUMENTS

| | | | |
|---|---|---|---|
| 6,546,392 | B1 | 4/2003 | Bahimann |
| 7,191,464 | B2 | 3/2007 | Cromer et al. |
| 7,222,062 | B2 | 5/2007 | Goud et al. |
| 7,275,263 | B2 | 9/2007 | Bajikar et al. |
| 7,313,679 | B2 | 12/2007 | Ranganathan |
| 7,480,804 | B2 | 1/2009 | Bade et al. |
| 7,613,921 | B2 | 11/2009 | Scaralata |
| 7,953,778 | B2 | 5/2011 | McKenney et al. |
| 8,042,190 | B2 | 10/2011 | Sahita et al. |
| 8,060,934 | B2 | 11/2011 | Cabuk et al. |
| 8,151,262 | B2 | 4/2012 | Challener et al. |
| 8,201,216 | B2 | 6/2012 | Cha et al. |
| 8,249,257 | B2* | 8/2012 | Brutch .................. H04L 9/0836 380/279 |
| 8,433,924 | B2 | 4/2013 | Challener et al. |
| 8,522,018 | B2 | 8/2013 | Molina et al. |
| 8,549,288 | B2 | 10/2013 | Bade et al. |
| 9,250,951 | B2* | 2/2016 | Haikney .................. G06F 9/46 |
| 2002/0194482 | A1 | 12/2002 | Griffin et al. |
| 2002/0194496 | A1* | 12/2002 | Griffin .................... G06F 21/57 726/17 |
| 2005/0039013 | A1 | 2/2005 | Bajikar et al. |
| 2005/0138161 | A1 | 6/2005 | McDaniel et al. |
| 2005/0246525 | A1 | 11/2005 | Bade et al. |
| 2005/0246552 | A1 | 11/2005 | Bade et al. |
| 2006/0136708 | A1 | 6/2006 | Hajji et al. |
| 2008/0046581 | A1 | 2/2008 | Molina et al. |
| 2008/0178176 | A1 | 7/2008 | Berger et al. |
| 2008/0183767 | A1 | 7/2008 | Zhu et al. |
| 2008/0189250 | A1 | 8/2008 | Cha et al. |
| 2008/0235754 | A1 | 9/2008 | Wiseman et al. |
| 2008/0244569 | A1* | 10/2008 | Challener ............... G06F 21/57 718/1 |
| 2008/0281654 | A1 | 11/2008 | Carter et al. |
| 2008/0282348 | A1 | 11/2008 | Proudler et al. |
| 2009/0013406 | A1 | 1/2009 | Cabuk et al. |
| 2009/0125352 | A1 | 5/2009 | Miyake et al. |
| 2009/0125716 | A1 | 5/2009 | Wooten |
| 2009/0204964 | A1 | 8/2009 | Foley et al. |
| 2009/0292705 | A1 | 11/2009 | McKenney et al. |
| 2009/0328022 | A1 | 12/2009 | Brogan et al. |
| 2010/0083002 | A1 | 4/2010 | Cui et al. |
| 2010/0281273 | A1 | 11/2010 | Lee et al. |
| 2012/0084549 | A1 | 4/2012 | Mackintosh et al. |
| 2012/0131334 | A1 | 5/2012 | Haikney et al. |
| 2012/0216255 | A1 | 8/2012 | Haikney et al. |
| 2013/0080756 | A1 | 3/2013 | MacKintosh et al. |
| 2013/0212369 | A1 | 8/2013 | Imtiaz et al. |

FOREIGN PATENT DOCUMENTS

| | | |
|---|---|---|
| CN | 10104489 A | 9/2007 |
| EP | 1980970 A2 | 10/2008 |
| JP | 2010511209 A | 4/2010 |
| WO | 2012038211 A1 | 3/2012 |

OTHER PUBLICATIONS

U.S. Appl. No. 13/459,164 entitled "Attesting a Component of a System During a Boot Process"; Non-Final office action dated Apr. 12, 2013 (17 pg.).

U.S. Appl. No. 13/289,044 entitled "Method for Attesting a Plurality of Data Processing Systems"; Non-final office action dated Apr. 4, 2013 (17 pg.).

U.S. Appl. No. 13/289,044 entitled "Method for Attesting a Plurality of Data Processing Systems"; Final office action dated Oct. 22, 2013 (23 pg.).

U.S. Appl. No. 13/460,080 entitled "Attesting a Plurality of Data Processing Systems"; Non-final office action dated Apr. 19, 2013 (17 pg.).

U.S. Appl. No. 13/460,080 entitled "Attesting a Plurality of Data Processing Systems"; Final office action dated Oct. 22, 2013 (22 pg.).

Xu et al., "DR@FT: Efficient Remote Attestation Framework for Dynamic Systems," Sep. 20, 2010, Computer Security A Esorics 2010, Springer Berling Heidelberg, 16 pg.

Jie et al., "A Privacy-Preserving Integrity Measurement Architecture," 2010 Third Interational Symposium on Electronic Commerce and Security (ISECS) IEEE, Jul. 29, 2010, pp. 242-246, Abstract.

European Patent Office: Int'l Search Report dated Feb. 1, 2012; Int'l Application PCT/EP2011/064979, filed Aug. 31, 2011, International Business Machines Corporation 4 pg.

Imtiaz et al."Attesting Use of an Interactive Component During a Boor Process," U.S. Appl. No. 13/820,039, filed Feb. 28, 2013, 35 pg.

Chun, et al., "Decentralized Trust Management and Accountability in Federated Systems," Proceedings of the 37th Annual Hawaii International Conference on Systems Sciences, Jan. 2004, 9 pg.

Griffin, et al., "Trusted Virtual Domains: Toward Secure Distributed Services," Proceedings of the First Workshop on Hot Topics in System Dependability, Jun. 2005, 6 pg.

Mackintosh, et al., "Attesting a Component of a System During a Boot Process," U.S. Appl. No. 13/459,164, filed Apr. 28, 2012, 25 pg.

"TCG Infrastructure Working Group Architecture Part II—Integrity Management", Specification Version 1.0, Revision 1.0, Nov. 2006, 4 pg.

"TCG Specification Architecture Overview,", Specification Revision 1.4, Aug. 2007, 4 pg.

U.S. Appl. No. 13/460,080 entitled "Attesting a Plurality of Data Processing Systems"; Non-final office action dated Jul. 31, 2014 (15 pg.).

U.S. Appl. No. 13/460,080 entitled "Attesting a Plurality of Data Processing Systems"; Notice of Allowance dated Mar. 4, 2015.

European Patent Office: Int'l Application PCT/EP2011/064979; Int'l Search Report dated Feb. 1, 2012 (4 pg).

U.S. Appl. No. 13/820,039 entitled "Attesting Use of an Interactive Component During a Boot Process"; Non-final office action dated Jul. 31, 2014 (38 pg).

U.S. Appl. No. 13/820,039 entitled "Attesting Use of an Interactive Component During a Boot Process": Final office action dated Jan. 13, 2015 (24 pg).

PCT/IB2014/066231; International Search Report and Written Opinion dated Mar. 17, 2015. (9 pg).

U.S. Appl. No. 13/289,044 entitled "Method for Attesting a Plurality of Data Processing Systems"; Final office action dated Oct. 22, 2013 (17 pg).

U.S. Appl. No. 13/241,835 entitled "Attesting a Component of a System During a Boot Process"; Non-final office action dated Jan. 29, 2013 (15 pg.).

U.S. Appl. No. 13/241,835 entitled "Attesting a Component of a System During a Boot Process"; Final office action dated Jun. 18, 2013 (22 pg.).

U.S. Appl. No. 13/241,835 entitled "Attesting a Component of a System During a Boot Process"; Advisory action dated Aug. 30, 2013 (3 pg.).

International Application No. PCT/EP2011/066329, International Search Report, Nov. 7, 2011.

U.S. Appl. No. 13/459,164 entitled "Attesting a Component of a System During a Boot Process"; Final office action dated Sep. 27, 2013 (31 pg.).

\* cited by examiner

TECHNIQUES FOR ATTESTING DATA PROCESSING SYSTEMS

This application is a National Stage of International Application No. PCT/EP2011/066329 (which has a priority date of Nov. 18, 2010), entitled "A METHOD FOR ATTESTING A PLURALITY OF DATA PROCESSING SYSTEMS," filed Sep. 20, 2011, the disclosure of which is hereby incorporated herein by reference in its entirety for all purposes.

BACKGROUND

The disclosure generally relates to data processing systems and, more specifically, to techniques for attesting data processing systems.

Trusted boot is a process for booting and establishing a chain of trust in a computing system. With reference to data processing environment 100 of FIG. 1, for example, a system administrator takes delivery of a server (e.g., managed system 120) and proceeds to install system software. Managed system 120 includes a secure device 125, e.g. a Trusted Platform Module (TPM). Once managed system 120 is configured and booted, each component (hardware and/or software) of managed system 120 cryptographically measures another component and can "extend" (but not directly write to) a measurement value in a platform configuration register (PCR) of TPM 125.

Figure 1:
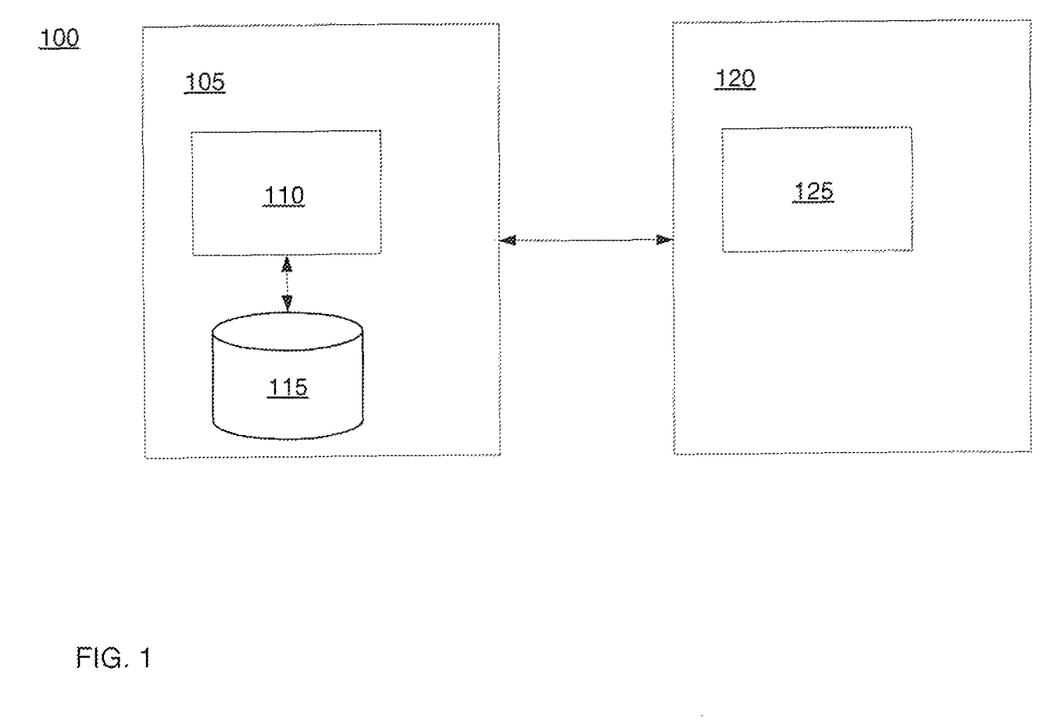
FIG. 1 is a block diagram of a data processing environment configured to carry out trusted boot and remote attestation processes.

Each component is also operable to access an event log in order to write data associated with the measurement of a component into an entry associated with the event log. The measurements can be remotely attested by a managing system 105 which has a database 115 to store expected attestation values for components of each managed system. The values are typically stored along with some metadata describing what the values mean. Managing system 105 includes a TPM emulator 110 that, for example, compares the measurements with the values. If there is no match between the measurements and the values, typically, managing system 105 has to further compare the measurements against a (large) list (e.g., a reference manifest) of measurement values provided by manufacturers of components. Typically, a reference manifest includes a large number of measurement values associated with each component of managed system 120 and these measurement values can be taken to be 'trusted'.

The remote attestation process may be initiated by either a managing or managed system. Changes to managed system 120 can be detected by subsequent trusted boot and remote attestation processes. The above processes are described, for example, in section 4 of the Trusted Computing Group (TCG) Specification Architecture Overview; Specification; Revision 1.4; 2nd Aug. 2007 and section 2 of the TCG Infrastructure Working Group Architecture Part II—Integrity Management; Specification Version 1.0; Revision 1.0; 17th Nov. 2006.

As described above, attestation is currently concerned with verifying a single machine, be it a physical machine with a real TPM or a virtual machine (VM) with a virtual TPM. Verifying individual machines is a reasonable approach for owners of individual machines. However, end-users or corporations may deal in a granularity much larger than a single machine. For example, a large corporation may wish to attest each of its VMs on a particular physical machine, each of its VMs within a particular machine pool, or each of its physical machines at a particular site. Similarly, datacenter owners may care about the integrity of their entire datacenter (and possibly sub-clusters within the entire datacenter). Instead of single machines, an entity may be concerned with tens, hundreds or even thousands of machines.

SUMMARY

A technique for attesting a plurality of data processing systems includes generating a logical grouping for a data processing system. The logical grouping is associated with a rule that describes a condition that must be met in order for the data processing system to be considered trusted. A list of one or more children associated with the logical grouping is retrieved. The one or more children are attested to determine whether each of the one or more children is trusted. In response to the attesting, the rule is applied to determine whether the condition has been met in order for the data processing system to be considered trusted. A plurality of logical groupings is associated to determine whether an associated plurality of data processing systems can be considered trusted.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

As will be appreciated by one of ordinary skill in the art, the present invention may be embodied as a method, system, device, or computer program product. Accordingly, the present invention may take the form of an embodiment including hardware, an embodiment including software (including firmware, resident software, microcode, etc.), or an embodiment combining software and hardware aspects that may all generally be referred to herein as a circuit, module, or system. The present invention may, for example, take the form of a computer program product on a computer-usable storage medium having computer-usable program code, e.g., in the form of one or more design files, embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or device. More specific examples (a non-exhaustive list) of the computer-readable storage medium include: a portable computer diskette, a hard disk, a random access memory (RAM), a read-only memory (ROM), an erasable programmable read-only memory (EPROM) or flash memory, a portable compact disc read-only memory (CD-ROM), an optical storage device, or a magnetic storage device. As used herein, the term "coupled" includes a direct electrical connection between elements or blocks and an indirect electrical connection between elements or blocks achieved using one or more intervening elements or blocks.

According to a first aspect of the present disclosure, a method for attesting a plurality of data processing systems includes generating a logical grouping for a data processing system. The logical grouping is associated with a rule that describes a condition that must be met in order for the data processing system to be considered trusted. The method also includes retrieving a list of one or more children associated with the logical grouping and attesting the one or more children in order to determine whether each of the one or more children are trusted. In response to the attesting, the rule is applied in order to determine whether the condition has been met for the data processing system to be considered trusted. Finally, the method includes associating a plurality of logical groupings to determine whether an associated plurality of data processing systems can be considered trusted.

According to a second aspect of the present disclosure, an apparatus for attesting a plurality of data processing systems includes logic for generating a logical grouping for a data processing system. The logical grouping is associated with a rule that describes a condition that must be met in order for the data processing system to be considered trusted. The apparatus also includes logic for retrieving a list of one or more children associated with the logical grouping and logic for attesting the one or more children in order to determine whether each of the one or more children are trusted. The apparatus further includes logic for applying the rule in order to determine whether the condition has been met for the data processing system to be considered trusted. Finally, the apparatus includes logic for associating a plurality of logical groupings to determine whether an associated plurality of data processing systems can be considered trusted.

According to a third aspect of the present disclosure, a computer program includes computer program code stored on a computer readable medium to, when loaded into a computer system and executed thereon, cause the computer system to perform the method described above with respect to the first aspect of the present disclosure.

Figure 2:
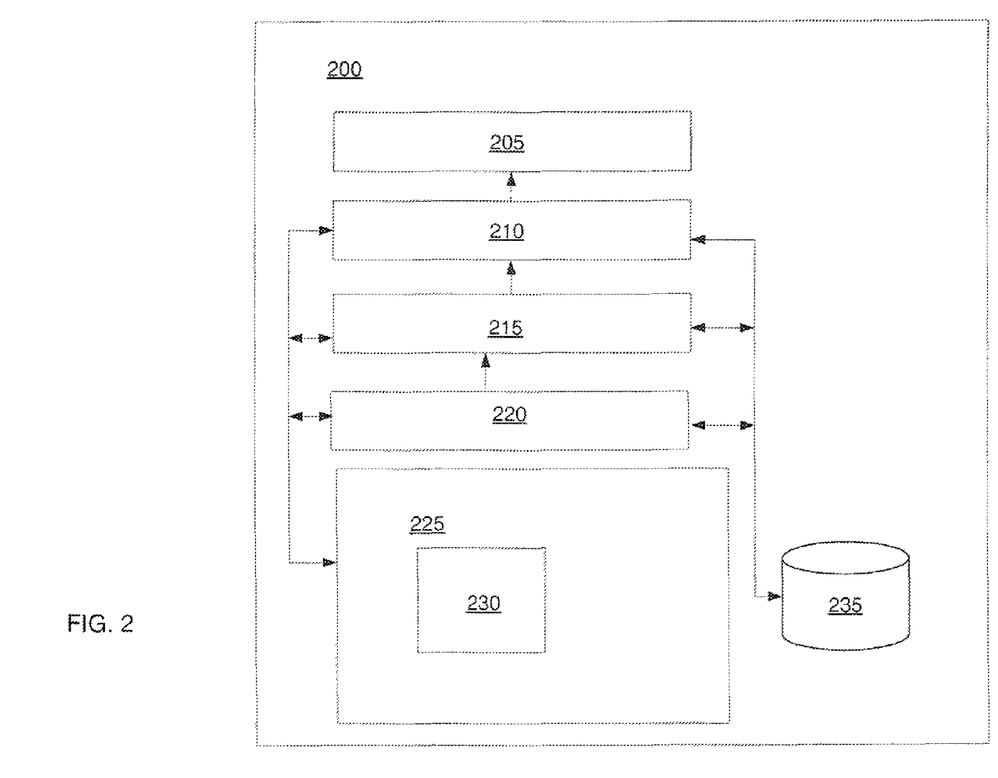
FIG. 2 is a block diagram showing components of a managed system.

With reference to FIG. 2, a managed system 200 is illustrated. During a trusted boot process, each component of managed system 200 cryptographically measures (e.g., using secure hash algorithm (SHA) to create a hash of information such as a software file, a model, make, serial number of a component, etc. in order to create a measurement value) another boot component. As one example, a core root of trust for measurement (CRTM) component 220, e.g., a BIOS, is the first piece of code which is given control during boot and must be implicitly trusted as it is immutable. CRTM 220 cryptographically measures the next component in the boot process (e.g., firmware 215). Subsequently, firmware 215 measures the next component in the boot process (e.g., operating system (OS) 210) and OS 210 then measures any user space programs 205 before control is transferred to any of user space programs 205. Each component can "extend" (but not directly write to) a measurement value in a platform configuration register (PCR) 230 of TPM 225 before control is transferred to the measured component.

An extend operation includes a cryptographic combination of a current value of the PCR 230 and a measurement value (signed with a public/private key pair of the managed system 200 with the private key being known only to TPM 225. Each component is also operable to access an event log 235 in order to write data associated with the measurement of a component (e.g., metadata (such as a component identifier and an event) and an associated measurement value) into an entry associated with event log 235. It should be noted that CRTM component 220 executes in a restricted environment where it cannot typically access event log 235. It should also be noted that although user space program 205 is operable to use TPM 225 and event log 235, it is optional as to whether it does so since user space program 205 does not tend to load other software components itself. Once managed system 200 is running, data associated with a "chain of trust" can be extracted for inspection by a remote managing system 305 (see FIG. 3) using a remote attestation procedure, e.g., direct anonymous attestation (DAA) as is further described below.

Figure 3:
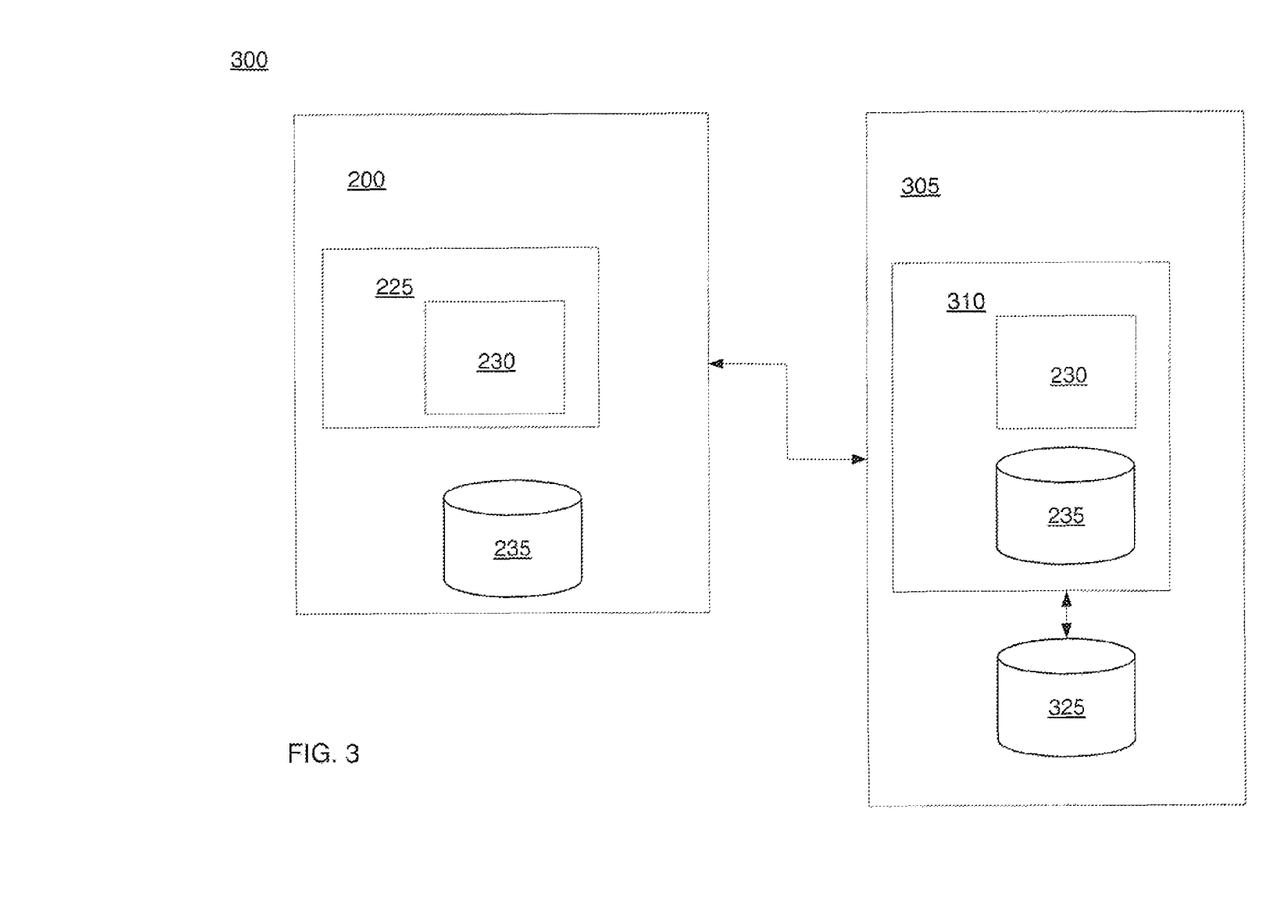
FIG. 3 is a block diagram of a data processing environment for carrying out trusted boot and remote attestation processes.

With reference to FIG. 3, managing system 300 and managed system 200, which includes associated components TPM 225, PCRs 230, and event log 235 (which includes one or more measurement values and associated metadata), are illustrated. An attestation process typically involves managed system 200 sending current PCRs 230 for measured components together with event log 235 to managing system 305. A simplified example of an attestation process performed on the managing system 305 is described with reference to FIG. 4.

Figure 4:
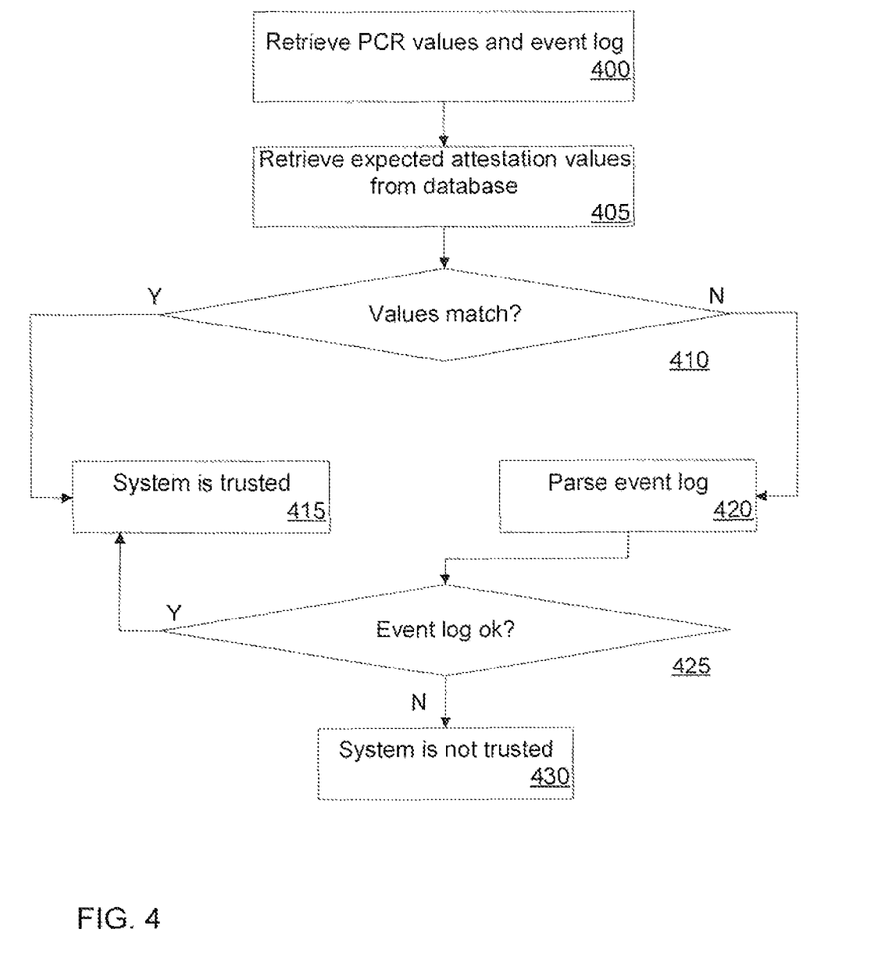
FIG. 4 is a flow chart of a remote attestation process.

In FIG. 4, at block 400, current PCRs 230 and event log 235 are retrieved. At block 405, expected attestation values associated with components of the managed system 200 are retrieved from event log 235, e.g., stored in a database. At block 410, emulator 310 of the managing system 305 compares the values of received PCRs 230 with the expected attestation values. It should be understood that a number of other components of the managing system 305 could execute the comparison logic. If a match occurs for each PCR value, managed system 200 is considered to be trusted (block 415) and no further work is done. If a match does not occur for each PCR value, managing system 305 parses (block 420) event log 235, inspecting each entry in turn to decide whether or not measurement value(s) contained in an entry associated with a measured component in question is valid.

If each entry of event log 235 appears to be valid (positive result in block 425), managed system 200 is considered to be trusted (block 415) and no further work is done. If the event log entry appears not to be valid (negative result in block 425), managed system 200 is not considered to be trusted (block 430), at which point a security alert may be raised before moving to a "System untrusted" exit state. Typically, manufacturers of components of managed system 200 provide a (large) list (e.g., a reference manifest) of measurement values associated with a component that can be taken to be 'trusted'. The trusted boot process is highly deterministic and associated events which appear in event log 235 typically follow a strict pattern. In an example where CRTM 220 measures firmware 215 (which in turn measures operating system 210), event log 235 typically comprises two events, namely, 'firmware measured' and 'operating system measured'. Even if firmware 215 and/or OS 210 are changed (e.g., updated) during a future boot process, the same two events will occur in the same order and only the associated measurement values will differ.

Each measurement value may be associated with the same PCR. In this case, managing system 305 may maintain a record indicating that the last time managed system 200 booted, it was using firmware version X with a measurement of M1 and an OS version Y with a measurement of M2, where M1 and M2 are SHA digests of the firmware boot component and OS boot component, respectively. The two events together with the measurement values, namely, "firmware measured: SHA(M1)" and "operating system measured: SHA(M2)", when extended into a PCR, give a PCR value of 'Z'. The PCR value of 'Z' is recorded as an expected attestation value for firmware 215 and OS 210 in database 325 of managing system 305.

During a subsequent attestation process, managing system 305 retrieves (block 400) current PCRs 230 together with event log 235 and retrieves (block 405) the expected attestation values from database 325. At block 410, emulator 310 compares the values of the received PCRs with the expected attestation values. If a match occurs, it is determined (block 415) that managed system 200 is using expected firmware 215 and OS 210. If a match does not occur, (i.e., the received PCR value is not 'Z'), managing system 305 parses (block 420) event log 235 to find associated entries. Managing system 305 compares the first event and measurement value, namely, "firmware measured: SHA(M1)" with a list of trusted values provided by the particular manufacturer of the firmware and compares the second event and measurement value, namely, "operating system measured: SHA(M2)" with a list of trusted values provided by the particular manufacturer of the OS. If either component has a measurement value which the manufacturer has not listed as "trusted", managed system 200 is assumed (block 430) to be compromised. If both components have a measurement value which the manufacturer has listed as "trusted", managed system 200 is assumed (block 415) to be trusted and the measurement values can be associated with a new expected attestation value(s) that is used during the next attestation process of managed system 200.

Figure 5A:
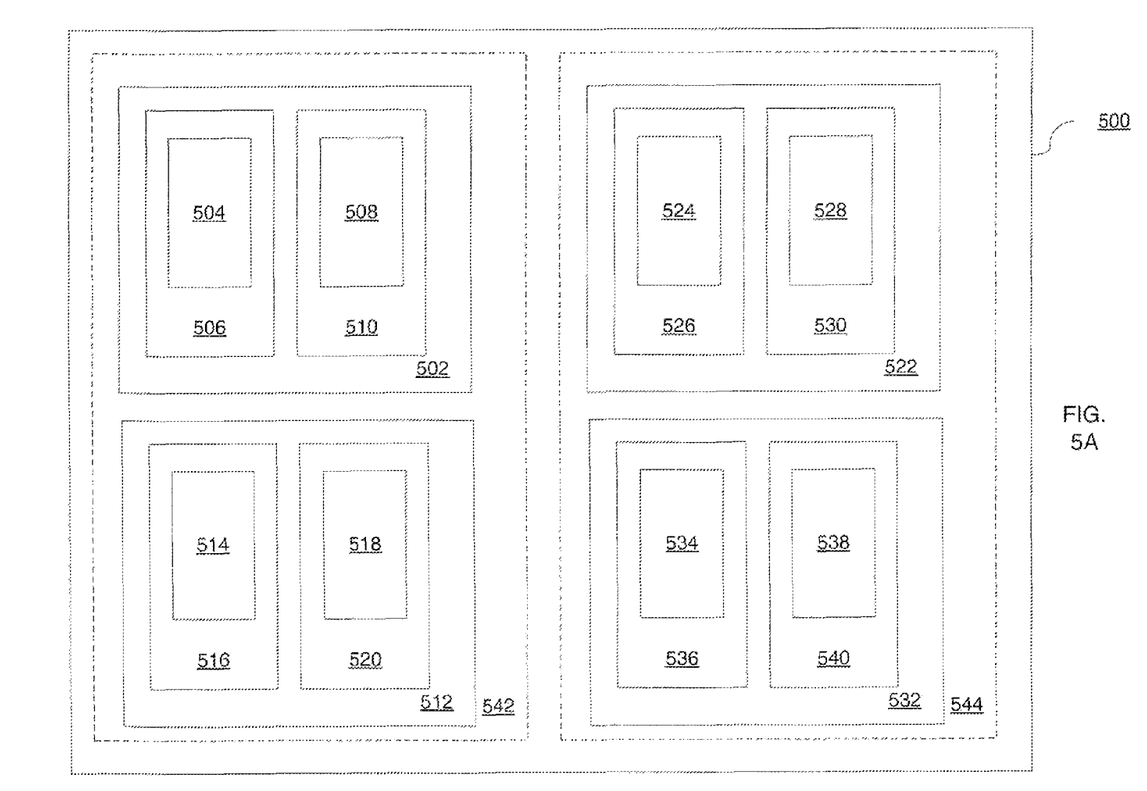
FIG. 5A is a block diagram showing a physical organization of machines within a typical datacenter, according to one embodiment of the present disclosure.

FIG. 5A is a block diagram showing a physical organization of machines within a datacenter 500. Datacenter 500 includes a plurality of machine pools 542 and 544, each of which include a plurality of machines 502 and 512, and 522 and 532, respectively. Each machine 502, 512, 522 and 532 includes a plurality of virtual machines (VMs) 506 and 510, 516 and 520, 526 and 530, 536 and 540, respectively. Each virtual machine 506, 510, 516, 520, 526, 530, 536, and 540 includes a plurality of PCRs 504, 508, 514, 518, 524, 528, 534, and 538, respectively.

In one or more embodiments logic for generating an "attestation set" includes, from the perspective of managing system, a logical grouping of components associated with a datacenter. Each component can be, for example, an entire system or a machine that represents a managed system. An attestation set can be created automatically or manually. A set can be created automatically by, for example, software associated with the datacenter. Assuming that the components of the datacenter have been organized into a hierarchy having metadata, the software can create sets by identifying a component (e.g., using the metadata) and associating the component with its children (e.g., using the metadata) e.g., a VM is associated with an attestation set containing PCRs of the VM. Alternatively, a set can be created manually by inspection of the hierarchy of the datacenter. Manual inspection allows for the greatest flexibility and does not rely on the presence of software for automating set creation. Details associated with sets may be maintained by a managing system. For example, software on a managing system can read a text file containing set descriptions or receive a text file as input and convert set descriptions into internal representations to be stored in binary on a disk. An attestation set can include 'child' attestation sets or individual PCRs of a component.

Advantageously, through the use of attestation sets a plurality of components of a datacenter can be attested according to the present disclosure. In one or more embodiments, any component in the hierarchy of datacenter 500 can be queried for its attestation status. With reference again to FIG. 5A, machine pool 542 includes Machine1 502 and Machine2 512. Machine1 502 runs VM_A 506 (which is, for example, owned by Red_Company) and Machine1 502 also runs VM_B 510 (which is, for example, owned by Blue_Company). Machine2 512 runs VM_C 516 (which is, for example, owned by Red_Company) and Machine2 512 also runs VM_D 520 (which is, for example, owned by Blue_Company). The examples that follow demonstrate how different groupings of components can be used by different audiences.

In a first example (Example 1), a datacenter owner may wish to attest each VM in a machine pool, which results in an associated attestation set, e.g., VM_A, VM_B, VM_C, and VM_D. In a second example, (Example 2), a systems administrator may wish to attest each VM on a particular physical machine resulting in an associated attestation set, e.g., VM_A and VM_B on Machine1. In a third example (Example 3), a company may wish to attest each of their VMs regardless of the physical machine on which they reside resulting in an associated attestation set, e.g., VM_B and VM_D. Other examples of groupings of components may include one or more machine pools. In at least one embodiment, an attestation set includes a list of records associated with particular components of a datacenter (e.g., a PCR, a VM, a machine, or a machine pool). As one example, Attestation Set_A is given below:

```
{
    PCRs 0-15.VM-A.Machine1.Machine Pool 1
    PCRs 2-6.VM-C.Machine2.Machine Pool 1
}
```

In one or more embodiments, default values for components of a datacenter can be set (e.g., a default set of PCRs) to allows for convenience in the creation of attestation sets. For example, if each VM in a datacenter has 16 PCRs (of which only the even-numbered ones are important) and thousands of VMs are present in the datacenter, it can become cumbersome to generate an attestation set for each VM. For example, an attestation set for each VM may be generated as follows:

```
Attestation_Set_VM_n =
{
    Child1 = PCRs 0,2,4,6,8,10,12,14; VM_n
}
```

A default description of an attestation set can be generated as follows:

```
default_PCRs = 0,2,4,6,8,10,12
Attestation_Set_VM_n =
{
Child1 = default_PCRs: VM_n
}
```

Each attestation set may have an associated rule to describe how to decide whether the set is trusted. If an attestation set does not comprise an associated rule, a default rule maybe applied. As one example, a rule may govern that a set is trusted based on the status of its children. For example, all children of a set must be deemed trusted before a parent set is deemed trusted. As another example of a rule, either 50% of the children must be deemed trusted or a highest priority child must be deemed trusted before a parent set is deemed trusted. As yet another example, a rule may govern that a set is trusted based on a time value to allow, for example, a child to be untrusted during a known maintenance period. For example, a child can be deemed trusted if a current time value is between 0400 and 0430 otherwise it is deemed untrusted (until proven otherwise e.g., by using an attestation process). In yet another example, a rule may govern that a set is always trusted or always untrusted. For example, an "always trusted" rule can be used to temporarily stop the raising of an alarm on a machine which is known to be faulty and an "always untrusted" rule can be used to test that a security alarm mechanism works correctly.

In a fourth example (Example 4, which is associated with Example 1), an attestation set may be given as follows:

```
Attestation Set_1 =
{
    Child1 = PCRs[0-15].VM[A].Machine[1]
    Child2 = PCRs[0-15].VM[B].Machine[1]
    Child3 = PCRs[0-15].VM[C].Machine[2]
    Child4 = PCRs[0-15].VM[D].Machine[2]
    Rule = if(all children are trusted) then TRUSTED else
    UNTRUSTED;
}
```

In the above rule, all children of a set must be deemed trusted before a parent set is deemed trusted.

In a fifth example (Example 5, which is associated with Example 2), an attestation set may be given as follows:

```
Attestation Set_2 =
{
    Child1 = PCRs[0-15].VM[A].Machine[1]
    Child2 = PCRs[0-15].VM[B].Machine[1]
    Rule = if(> 25% all children are trusted) then TRUSTED else
    UNTRUSTED;
}
```

In the above rule, more than 25% of children of a set must be deemed trusted before a parent set is deemed trusted.

In a sixth example (Example 6, which is associated with Example 3), an attestation set may be given as follows:

```
Attestation Set_3 =
{
    Child1 = PCRs[0-15].VM[B].Machine[1]
    Child2 = PCRs[0-15].VM[D].Machine[2]
    Rule = if( (Child1 is trusted) == (Chlid2 is trusted)) then TRUSTED
    else UNTRUSTED
}
```

In the above rule, a parent set is deemed trusted when the trusted state of its children are equal (i.e., both children must be deemed trusted or both children must be deemed untrusted). The above rule can be used, for example, if Child1 and Child2 are configured to always have software updates applied in parallel. If either child is updated without the other child also being updated, one child will fail attestation and the other child will pass attestation meaning that the parent set will be deemed to be untrusted (so that, for example, an alert can be raised to an administrator). In the above examples, each attestation set specifies the particular components that are of interest. However, the attestation sets above do not necessarily reflect a hierarchy associated with a physical hierarchy of a datacenter configuration or a functional dependency of a datacenter.

Figure 5B:
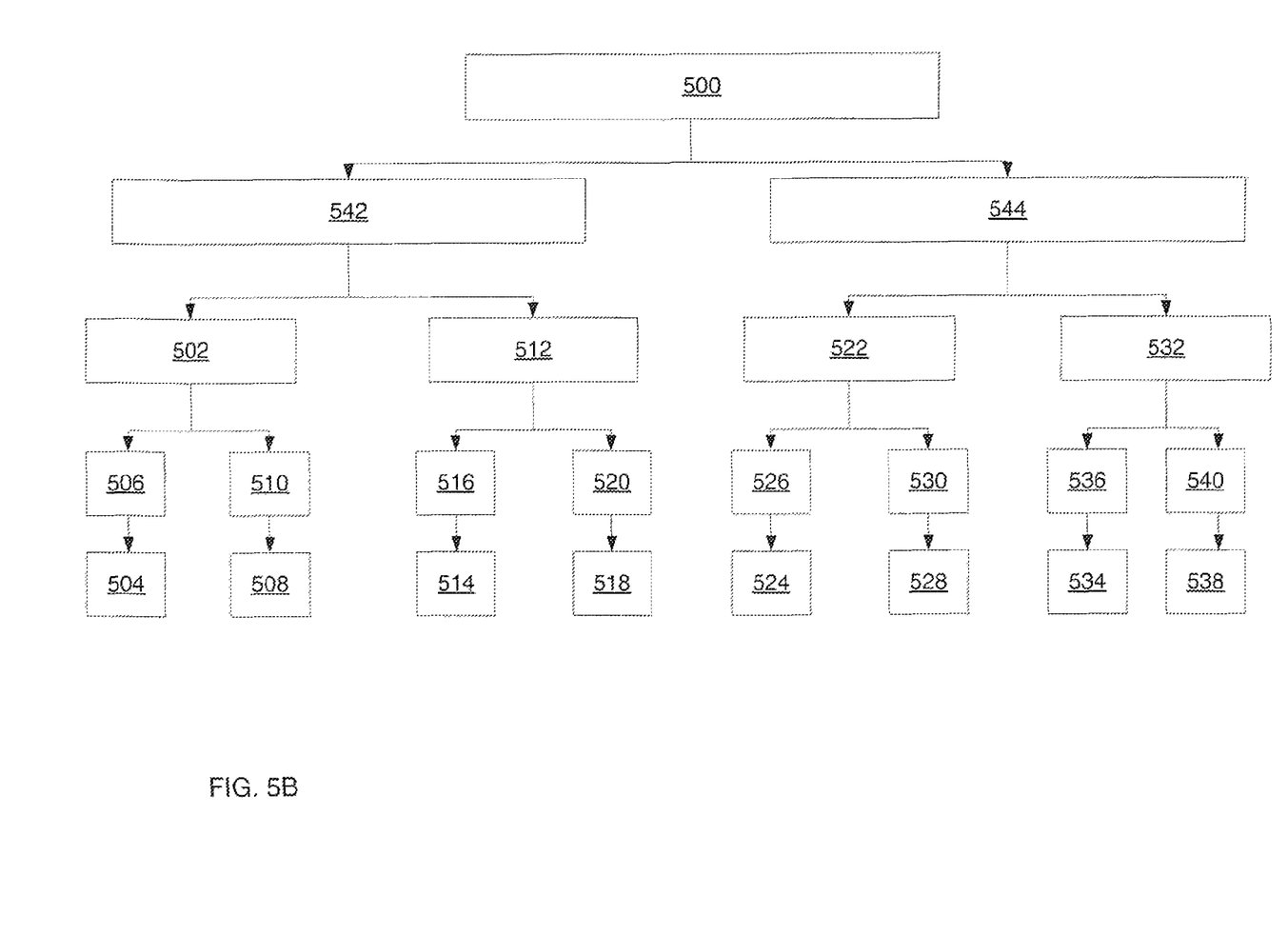
FIG. 5B is a block diagram showing a logical hierarchy of the physical organization of the machines of FIG. 5A according to one embodiment of the present disclosure.

With reference to FIG. 5B, an attestation set can be associated with a logical hierarchy that mirrors a physical hierarchy of datacenter 500. For example, an attestation set can be created for each VM (e.g., VM 506) as follows:

```
Attestation_Set_VM_A =
{
    Child1 = PCRs[0-15].VM[A]
}
```

As another example, an attestation set can be created for each machine with an attestation status of a machine (e.g., Machine1 502) being in union with the attestation status of each of its VM's attestation sets (e.g., Attestation_Set_VM_A and Attestation_Set_VM_B) as follows:

```
Attestation_Set_Machine1 =
{
    Child1 = Attestation_Set_VM_A
    Child2 = Attestation_Set_VM_B
}
```

As yet another example, an attestation set can be created for each machine pool with an attestation status of a machine pool (e.g., Machine Pool1 542) being in union with the attestation status of each of its machine's attestation sets (e.g., Attestation_Set_Machine1 and Attestation_Set_Machine2) as follows:

```
Attestation_Set_Pool1 =
{
    Child1 = Attestation_Set_Machine1
    Child2 = Attestation_Set_Machine2
}
```

As another example, an attestation set can be created for each datacenter with an attestation status of the datacenter (e.g., datacenter 500) being in union with the attestation status of each of its machine pool's attestation sets (e.g., Attesatation_Set_Pool1 and Attesatation_Set_Pool2) as follows:

```
Attestation_Set_Datacenter =
{
    Child1 = Attesatation_Set_Pool1
    Child2 = Attesatation_Set_Pool2
}
```

Figure 5C:
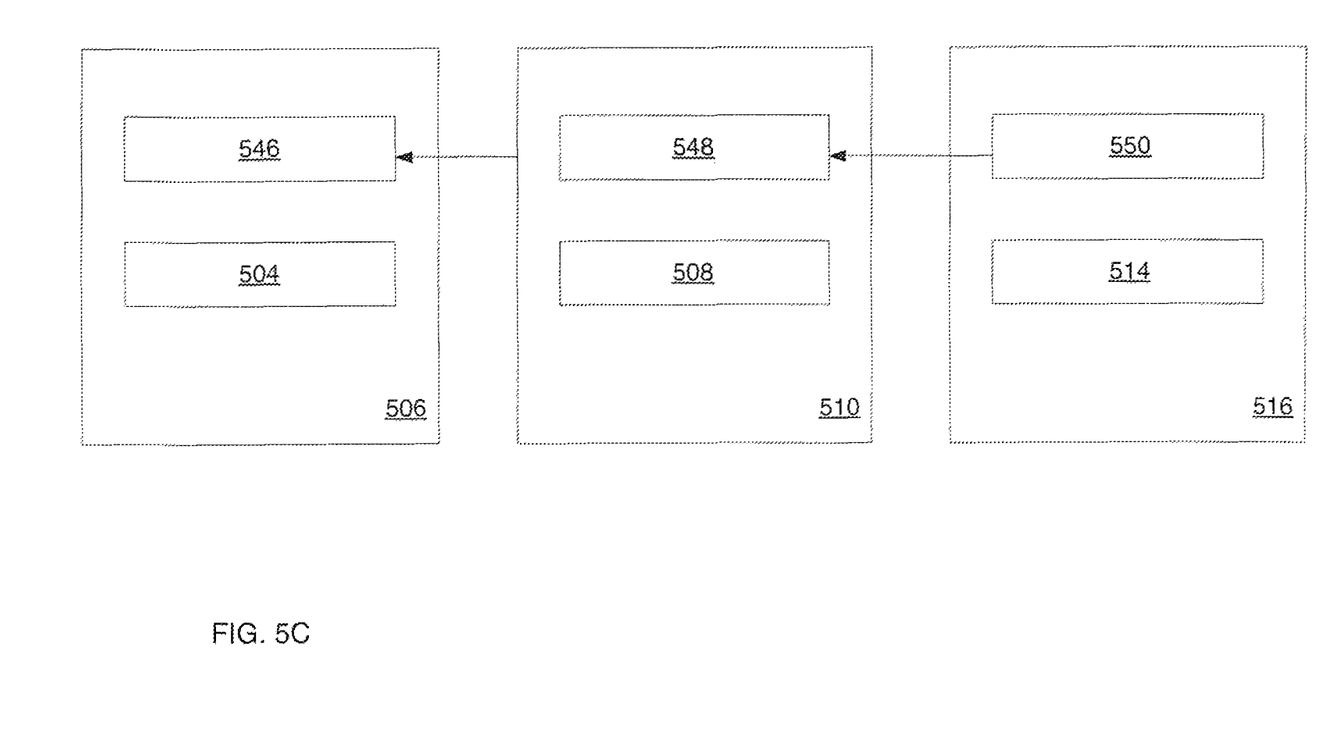
FIGS. 5C and 5D are block diagrams showing functional dependencies associated with components of the datacenter of FIG. 5A.
Figure 5D:
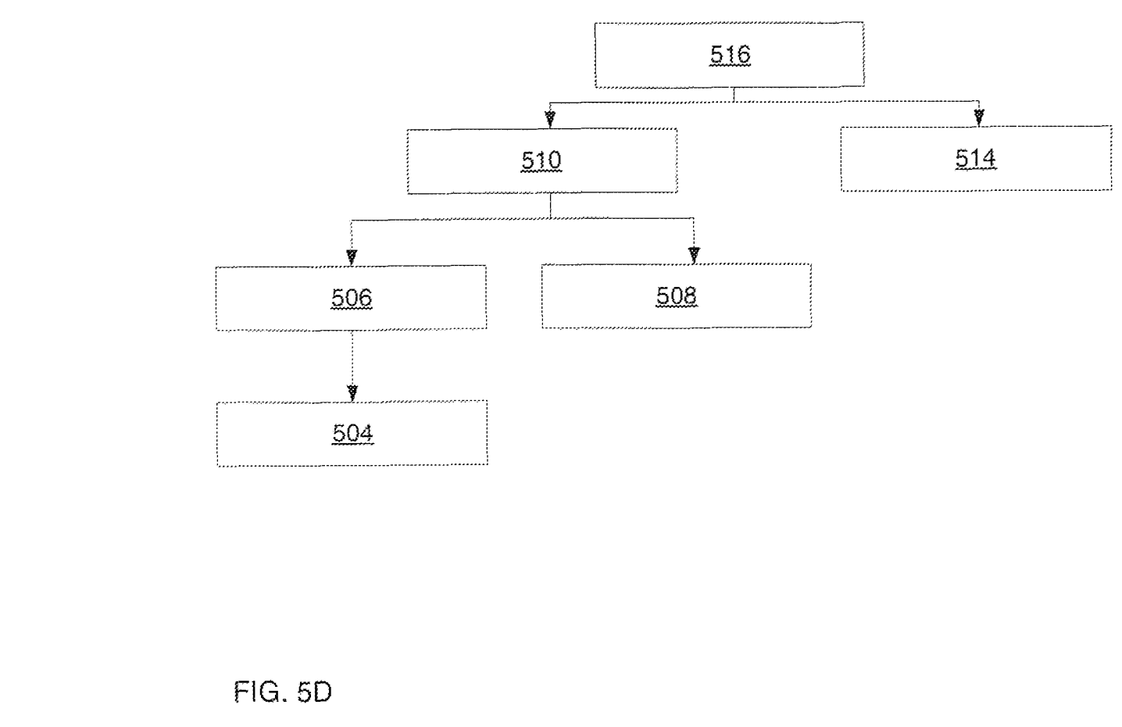

With reference to FIGS. 5C and 5D, an attestation set can be associated with functional dependency of a datacenter rather than a physical hierarchy. With reference to FIG. 5C, VM_A 506, VM_B 510, and VM_C 516 cooperate to provide a web service with associated PCRs 504, 508, and 514, respectively. VM_C 516 hosts a primary webserver 550, which hosts a website. Primary webserver 550 uses a secondary webserver 548 (e.g., hosted on VM_B 510) whenever a particular web page on the website is requested. Secondary webserver 548 uses a database 546 hosted on VM_A 506 to retrieve information needed to display the web page. In this way, each VM is functionally dependent upon another VM.

With reference to FIG. 5D, a further depiction of the functional dependency is shown with a VM being associated with its PCRs and another VM. For example, VM_C 516 is associated with its PCRs 514 and VM_B 510, VM_B 510 is associated with its PCRs 508 and VM_A 506, and VM_A 506 is associated with its PCRs 504. Examples of how attestation sets can be associated with the functional dependency depicted in FIG. 5D are given below:

```
Attestation_Set_VM_A =
{
    Child1 = PCR[0-15].VM[A]
}
Attestation_Set_VM_B =
{
    Child1 = PCR[0-15].VM[B]
    Child2 = Attestation_Set_VM_A
}
Attestation_Set_VM_C =
{
    Child1 = PCR[0-15].VM[C]
    Child2 = Attestation_Set_VM_B
}
```

An attestation set (to be attested) may be associated with a subset of the logical hierarchy illustrated in FIG. 5B (where datacenter 500 represents managed system 200). A managing system 305 may, for example, wish to attest the attestation set Attesatation_Set_Pool1 set forth below:

```
Attesatation_Set_Pool1 =
{
    Child1 = Attestation_Set_Machine1
    Child2 = Attestation_Set_Machine2
}
where,
Attestation_Set_Machine1 =
{
    Child1 = Attestation_Set_VM_A
    Child2 = Attestation_Set_VM_B
}
Attestation_Set_VM_A =
{
    Child1 = PCRs[0-15].VM[A]
}
```

```
Attestation_Set_VM_B =
{
    Child1 = PCRs[0-15].VM[B]
}
Attestation_Set_Machine2 =
{
    Child1 = Attestation_Set_VM_C
    Child2 = Attestation_Set_VM_D
}
Attestation_Set_VM_C =
{
    Child1 = PCRs[0-15].VM[C]
}
Attestation_Set_VM_D =
{
    Child1 = PCRs[0-15].VM[D]
}
```

Figure 6:
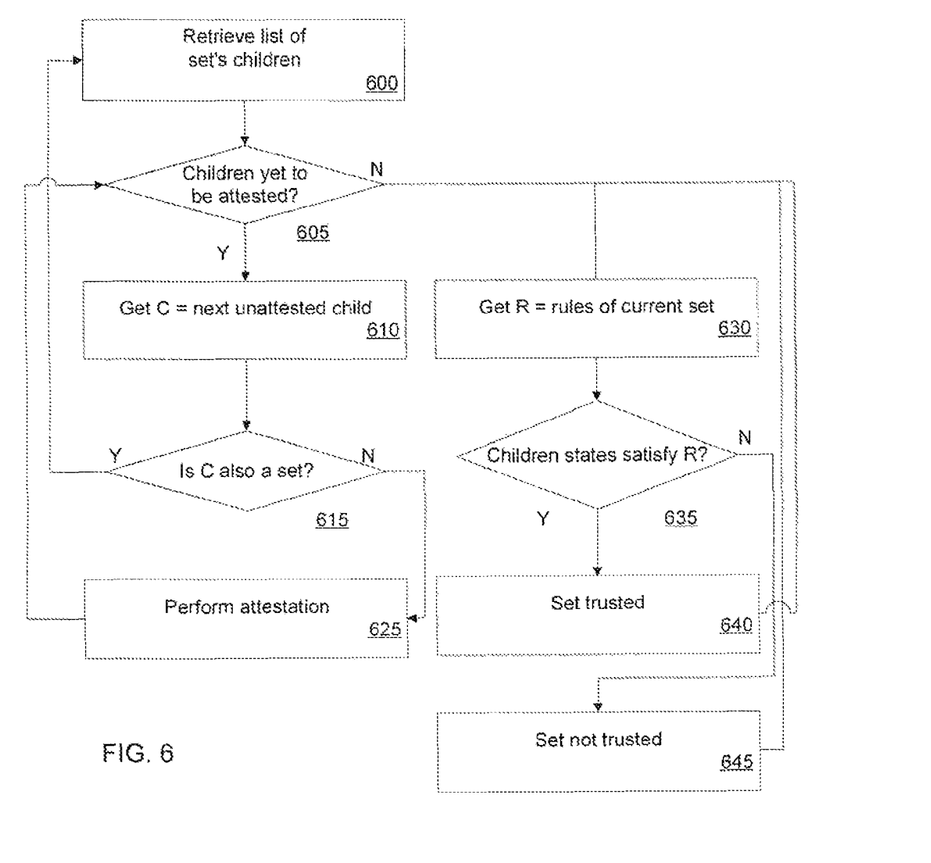
FIG. 6 is a flow chart showing an attestation process according to the one embodiment of the present disclosure.

With reference to the process of FIG. 6, at block 600, for the attestation set Attestation_Set_Pool1, a list of the set's children is retrieved, e.g., List 1: Machine1 and Machine2. At block 605, a determination is made as to whether any of the children of the set (List 1) are yet to be attested. In the example, as neither Machine1 nor Machine2 have been attested, the process passes to block 610 where details of an unattested child are retrieved (in this example, Machine1). A process to attest Machine1 begins and a pointer to Machine2 is saved. At block 615, it is determined whether the unattested child is also an attestation set. For example, managing system 305 parses the set description in order to determine the value that follows the parameter 'Childx'. If the value begins with 'PCRs', managing system 305 determines that the child is not an attestation set. If the value begins with a value that is not "PCRs", managing system 305 determines that the child is also an attestation set.

Managing system 305 may store a flag alongside each child indicating whether or not the child is an attestation set. As an example, child set 'Machine1' may also be an attestation set as set forth below:

```
Attestation_Set_Machine1 =
{
    Child1 = Attestation_Set_VM_A
    Child2 = Attestation_Set_VM_B
}
```

The process returns to block 600, where a list of the set's children is retrieved, e.g., List 2: VM_A and VM_B, for the attestation set Attestation_Set_Machine1. At block 605, a determination is made as to whether any of the children of the set 'Attestation_Set_Machine1' are yet to be attested. In the example, as neither VM_A nor VM_B have been attested, the process passes to block 610 where details of an unattested child (in this example, VM_A) are retrieved. A process to attest VM_A begins and a pointer to VM_B is saved. It should be noted that the state of Machine1 at level 'N' is saved and control is passed to recursion level N+1 (associated with VM_A and VM_B). At block 615, it is determined whether the unattested child is also an attestation set. VM_A may also be an attestation set as is illustrated below:

```
Attestation_Set_VM_A =
{
    Child1 = PCRs[0-15].VM[A]
}
```

The process returns to block 600 where, for the attestation set Attestation_Set_VM_A, a list of the set's children is retrieved e.g., List 3: PCRs[0-15]. At block 605, a determination is made as to whether any of the children of the set Attestation_Set_VM_A are yet to be attested. In the example, as PCRs[0-15] have not been attested, the process passes to block 610 where details of unattested children (in this example, PCRs[0-15]) are retrieved. At block 615, it is determined whether the unattested child is also an attestation set. In the example, PCRs[0-15] is not an attestation set and the process passes to block 625. Managing system 305 performs an attestation in order to determine either a trusted state or an untrusted state for PCRs[0-15] by contacting VM_A to retrieve PCRs[0-15] together with event log 235. Managing system 305 then retrieves expected attestation values associated with the retrieved PCRs in order to compare the expected attestation values with the retrieved PCRs. If a match occurs for each PCR value, VM_A is considered to be trusted and no further work is done.

If a match does not occur for each PCR value, managing system 305 parses event log 235, inspecting each entry in turn to decide whether or not a measurement value(s) contained in an entry associated with the PCRs in question is valid (in accordance with a list of trusted values provided by a particular manufacturer). If each event log entry appears to be valid, VM_A is considered to be trusted and no further work is done. If the event log entry appears not to be valid, VM_A is not considered to be trusted. In the example, following the process of FIG. 6, the PCRs[0-15] of VM_A are deemed to be trusted. The process passes to block 605, where it is determined whether any of the children are yet to be attested. As there are no further children to be attested, the process passes to block 630, where a rule (e.g., Rule 1=if(>25% all children are trusted) then TRUSTED else UNTRUSTED) associated with the current attestation set, namely, Attestation_Set_VM_A, is retrieved.

At block 635, if the rule is satisfied, Attestation_Set_VM_A is deemed trusted and if the rule is not satisfied, Attestation_Set_VM_A is deemed not trusted. In the example, as PCRs[0-15] (>25% of all children) of VM_A are deemed to be trusted, Attestation_Set_VM_A is deemed trusted. The process passes to block 605 and recurses up one level (to N) where it is determined whether any of the children of the set (Attestation_Set_Machine1) are yet to be attested. With reference to the saved pointer, as VM_B is yet to be attested, the process passes to block 610 where details of the unattested child are retrieved. A process to attest VM_B begins. At block 615, it is determined whether the unattested child is also an attestation set. In the example, VM_B is also an attestation set as set forth below:

---
Attestation_Set_VM_B =
{
    Child1 = PCRs[0-15].VM[B]
}

---

The process returns to block 600 where, for the attestation set Attestation_Set_VM_B, a list of the set's children is retrieved, e.g., List 4: PCRs[0-15]. At block 605, a determination is made as to whether any of the children of the set (Attestation_Set_VM_B) are yet to be attested. In the example, as PCRs[0-15] have not been attested, the process passes to block 610 where details of any unattested children (in this example, PCRs[0-15]) are retrieved. At block 615, it is determined whether the unattested child is also an attestation set. In the example, PCRs[0-15] is not an attestation set and the process passes to block 625. With reference to the process of FIG. 4, managing system 305 performs an attestation in order to determine either a trusted state or an untrusted state for PCRs[0-15] by contacting VM_B to retrieve PCRs[0-15] together with event log 235. Assuming the PCRs[0-15] of VM_B are deemed to be trusted, the process passes to block 605, where it is determined whether any of the children are yet to be attested.

As there are no further children to be attested, the process passes to block 630, wherein a rule (e.g., Rule 2=if(all children are trusted) then TRUSTED else UNTRUSTED) associated with the current attestation set, namely, Attestation_Set_VM_B, is retrieved. At block 635, if the rule is satisfied, Attestation_Set_VM_B is deemed trusted and if the rule is not satisfied, Attestation_Set_VM_B is deemed not trusted. In the example, as PCRs[0-15] (all children) of VM_B are deemed to be trusted, Attestation_Set_VM_B is deemed trusted. The process passes to block 605 and recurses up one level (to N) where it is determined whether any of the children of the set (Attestation_Set_Machine1)) are yet to be attested. As there are no further children to be attested, the process passes to block 630, wherein a rule (e.g., Rule 3=if(all children are trusted) then TRUSTED else UNTRUSTED) associated with the current attestation set, namely, Attestation_Set_Machine1, is retrieved. At block 635, if the rule is satisfied, Attestation_Set_Machine1 is deemed trusted and if the rule is not satisfied, Attestation_Set_Machine1 is deemed not trusted. In the example, as VM_A and VM_B (all children) are deemed to be trusted, Attestation_Set_Machine1 is deemed trusted.

It should be noted that in the example, Machine1's PCRs do not form part of the attestation checks. However, alternatively, if a component has a TPM 125, attestation of its PCRs can also occur. For example, an attestation set for Machine1 can be used, wherein Child3 denotes Machine1's PCRs as follows:

---
Attestation_Set_Machine1 =
{
    Child1 = Attestation_Set_VM1
    Child2 = Attestation_Set_VM2
    Child3=PCRs[0-16].Machine1
}

---

As the process to attest Machine1 has completed, the process passes to block 605, where it is determined whether any of the remaining children of the set (Attesatation_Set_Pool1) are yet to be attested. With reference to the saved pointer, it is determined that Machine2 is yet to be attested and the process passes to block 610 where details of the unattested child (Machine2) are retrieved. It should be understood that the above process is repeated for Machine2 as has been shown for Machine1, resulting in states (trusted or untrusted) associated with Machine2's children (namely, Attestation_Set_VM_C and Attestation_Set_VM_D). In the example herein, the state associated with Attestation_Set_VM_C is trusted and the state associated with Attestation_Set_VM_D is trusted. In the example, Attestation_Set_Machine2 is also deemed trusted in accordance with its rule (not shown). Following attestation of Machine2, the process passes to block 605, where it is determined whether any of the remaining children of the set Attesatation_Set_Pool1 are yet to be attested. As there are no further children to be attested, the process passes to block 630, wherein a rule (e.g., Rule 4=if(all children are trusted) then TRUSTED else UNTRUSTED) associated with the current attestation set, namely, Attesatation_Set_Pool1, is retrieved.

At block 635, if the rule is satisfied, Attesatation_Set_Pool1 is deemed trusted and if the rule is not satisfied, Attesatation_Set_Pool1 is deemed not trusted. In the example, as Machine1 and Machine2 (all children) are deemed to be trusted, Attesatation_Set_Pool1 is deemed trusted. It should be noted that if attestation fails at any point in the hierarchy a user is able to examine the level below the failure to examine the cause (until eventually the individual faulting PCRs are identified). For example, if each VM Attesatation_Set_Pool1 is deemed trusted apart from VM A, Attestation_Set_VM_A will have an associated state of untrusted. As Attestation_Set_VM_A is Child1 of Attestation_Set_Machine1, given Rule 3, the state of Attestation_Set_Machine1 will be untrusted (even though the state of Child2 of Attestation_Set_Machine1 is trusted). In turn, as Attestation_Set_Machine1 is Child1 of Attestation_Set_Pool1, given Rule 4, the state of Attestation_Set_Pool1 will be untrusted.

As such, if a managing system requests attestation of Attestation_Set_Pool1, an untrusted result will be returned. The reason(s) for the failure may be displayed using a user interface. For example, at a first level, a report can be displayed, indicating that Attestation_Set_Pool1 is untrusted because Child1 (Attestation_Set_Machine1) is untrusted. In one or more embodiments, a user can query the report to determine the reason Attestation_Set_Machine1 has been deemed untrusted and so on until the user is informed that the underlying cause of the failure is that VM-A was deemed untrusted. Subsequently, the user may, for example, contact a systems administrator to determine what exactly failed in VM_A.

The present disclosure provides a mechanism in which the status of individual datacenter components can be obtained and coalesced such that an attestation result associated with a plurality of managed systems can be provided. Advantageously, given a set to attest, a managing system can determine the state of each of the children associated with the set. Each child may be an attestation set itself. In various implementations, one or more children may have already been attested because they appear in multiple sets. Advantageously, it is possible to define an attestation set to meet the needs of, for example, a datacenter owner, a system administrator, and/or an end customer.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," (and similar terms, such as includes, including, has, having, etc.) are open-ended when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. An apparatus configured to attest a plurality of data processing systems included in a datacenter, comprising:

logic configured to generate respective logical groupings for each of the data processing systems, wherein the logical groupings are associated with a rule that describes a condition that must be met in order for the data processing systems to be considered trusted, and wherein the datacenter includes a plurality of machine pools each of which includes two or more of the data processing systems, where each of the plurality of data processing systems includes a plurality of virtual machines each of which has an associated platform configuration register (PCR) that stores a measurement value;

logic configured to retrieve a list of one or more children associated with each of the logical groupings;

logic configured to attest the one or more children in order to determine whether each of the one or more children is trusted, wherein the attesting includes comparing the measurement value to an expected attestation value;

logic configure to, subsequent to the attesting, apply the rule to determine whether the condition has been met in order for the data processing systems to be considered trusted, wherein based on the rule a first one of the logical groupings is deemed trusted when all of the children of the first one of the logical groupings have a same untrusted state or a same trusted state, and wherein a child is associated with a PCR or a further logical grouping and when the child is associated with the further logical grouping the retrieving is repeated until another child associated with the PCR is found, where the apparatus is a data processing system.

2. The apparatus of claim 1, wherein the logical groupings are associated with at least one of a physical hierarchy and a functional dependency.

3. The apparatus of claim 1, wherein the attesting logic further comprises logic configured to determine either a trusted state or an untrusted state for a PCR in accordance with the expected attestation value or a trusted value.

4. The apparatus of claim 1, wherein a managing system is operable to maintain data associated with the logical groupings.

5. The apparatus of claim 1, wherein a managing system is configured with the logic configured to generate, retrieve, attest, and apply.

6. The apparatus of claim 1, wherein each of the data processing systems represent a managed system.

7. A computer program product, comprising:
a computer-readable storage device; and
computer program code stored on the computer-readable storage device, wherein the computer program code, when executed by a data processing system, configures the data processing system to:
generate respective logical groupings for a plurality of data processing systems in a datacenter, wherein the logical groupings are associated with a rule that describes a condition that must be met in order for the data processing systems to be considered trusted, and wherein the datacenter includes a plurality of machine pools each of which includes two or more of the data processing systems, where each of the plurality of data processing systems includes a plurality of virtual machines each of which has an associated platform configuration register (PCR) that stores a measurement value;
retrieve a list of one or more children associated with each of the logical groupings;
attest the one or more children to determine whether each of the one or more children is trusted, wherein the attesting includes comparing the measurement value to an expected attestation value;
subsequent to the attesting, apply the rule to determine whether the condition has been met in order for the data processing systems to be considered trusted, wherein based on the rule a first one of the logical groupings is deemed trusted when all of the children of the first one of the logical groupings have a same untrusted state or a same trusted state, and wherein a child is associated with a PCR or a further logical grouping and when the child is associated with the further logical grouping the retrieving is repeated until another child associated with the PCR is found.

* * * * *